United States Patent
Yu

(10) Patent No.: US 6,530,775 B2
(45) Date of Patent: Mar. 11, 2003

(54) TOP MOLD OF AN INJECTION MOLDING MACHINE

(75) Inventor: Young-Hee Yu, Seoul (KR)

(73) Assignee: Yudo Co., Ltd., Kyounggi-do (KR)

( * ) Notice: Subject to any disclaimer, the term of this patent is extended or adjusted under 35 U.S.C. 154(b) by 0 days.

(21) Appl. No.: 09/922,924

(22) Filed: Aug. 7, 2001

(65) Prior Publication Data

US 2002/0054931 A1 May 9, 2002

(30) Foreign Application Priority Data

Aug. 7, 2000 (KR) ...................................... 2000-045562

(51) Int. Cl.⁷ ............................................... B29C 45/22
(52) U.S. Cl. ...................................... 425/549; 425/572
(58) Field of Search .................................. 425/572, 549

(56) References Cited

U.S. PATENT DOCUMENTS 5,032,078 A * 7/1991 Benenati ..................... 425/572

* cited by examiner

Primary Examiner—Tim Heitbrink
(74) Attorney, Agent, or Firm—McDermott, Will & Emery

(57) ABSTRACT

A top mold of an injection molding machine is disclosed. The top mold of this invention has a cylinder housing having a pouring gate, a manifold housing having a manifold and mounted on the lower surface of the cylinder housing, and a nozzle housing having an injection nozzle and mounted on the lower surface of the manifold housing. The top mold also has a heating wire guide hole formed on the lower surface of the nozzle housing. A heating wire extends from an external power source to the injection nozzle through the heating wire guide hole. A clip holding slit is formed on the sidewall of the heating wire guide hole. A clip is held in the clip holding slit and supports the heating wire at a desired place within the heating wire guide hole. The top mold of this invention allows a user to easily and simply repair or replace a heating wire within a short period of time without entirely disassembling the top mold. This top mold is thus reduced in its maintenance cost, and reduces the time the injection molding process is stopped while repairing or replacing the heating wire.

1 Claim, 1 Drawing Sheet

Fig. 1
(PRIOR ART)
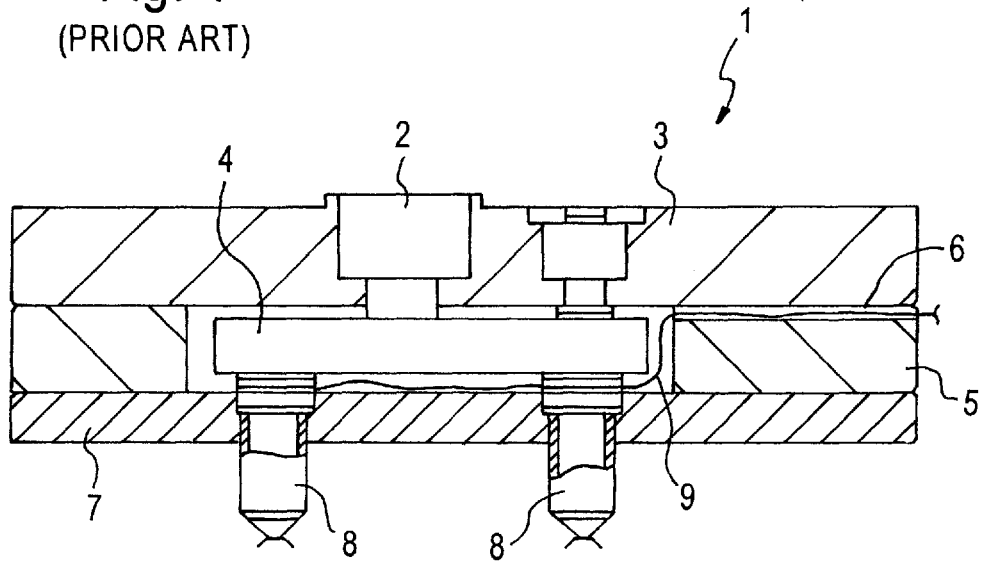
Fig. 2
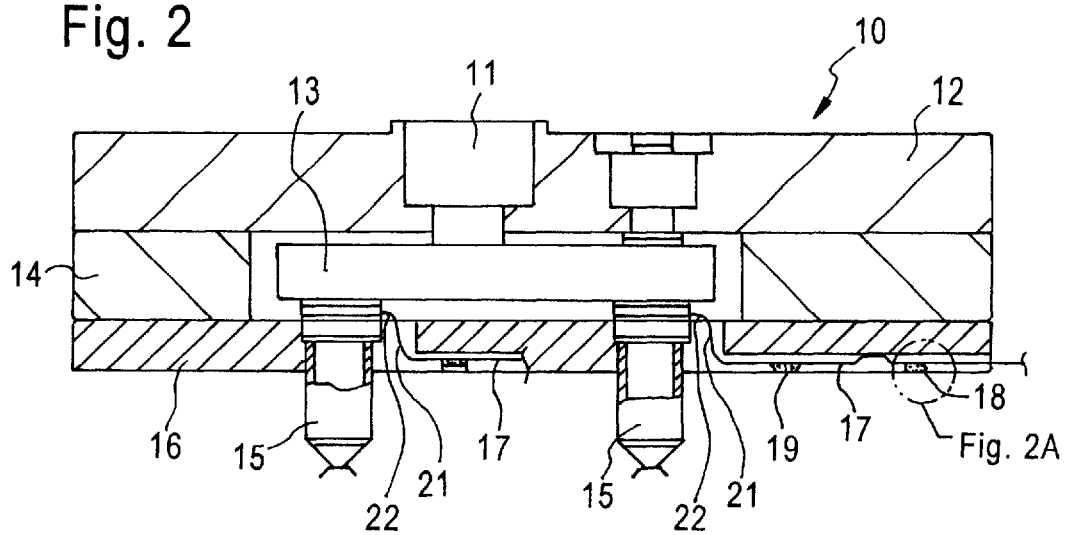
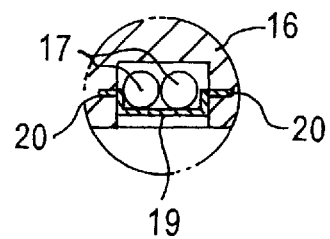
Fig. 2A

TOP MOLD OF AN INJECTION MOLDING MACHINE

BACKGROUND OF THE INVENTION

1. Field of the Invention

The present invention relates to a top mold of an injection molding machine, provided with a heating wire extending from an external power source to the injection nozzles of the top mold through a heating wire guide hole while passing around the manifold and electrically heating the injection nozzles during an injection molding process, and, more particularly, to a structural improvement in such a top mold allowing easy and simple repair or replacement of the heating wire within a short period of time without entirely disassembling the top mold, the structural improvement thus reducing the maintenance cost of the top mold and reducing the time the injection molding process Us stopped while repairing or replacing the heating wire.

2. Description of the Prior Art

In an injection molding process of producing plastic products, a molten plastic material is contained in an injection cylinder provided at a side of an injection molding machine, and is injected into the cavity formed in a bottom mold. In order to smoothly and uniformly inject the molten plastic material into the cavity of the bottom mold, a manifold is formed in the top mold, with a plurality of injection nozzles provided in the top mold at positions under the manifold for injecting the molten plastic material into the cavity of the bottom mold. During an injection molding process, a molten plastic material under pressure is injected into the cavity of the mold. When the plastic material within the cavity is hardened, the top mold is separated from the bottom mold so as to remove the plastic product from the cavity.

In order to prevent the molten plastic material from being undesirably hardened when it flows from the injection cylinder into the cavity of the bottom mold, a heating wire is arranged around both the manifold and the injection nozzles. That is, the heating wire passes through the manifold to heat the manifold, thus preventing the molten plastic material from being undesirably hardened within the manifold. The heating wire is also wound around the injection nozzles, and heats the nozzles. It is thus possible for the conventional top mold of the injection molding machine to prevent the molten plastic material from being undesirably hardened when the plastic material flows in the manifold or the injection nozzles during an injection molding process.

FIG. 1 is a sectional view of a conventional top mold of an injection molding machine. As shown in the drawing, the conventional top mold 1 of an injection molding machine includes a pouring gate 2, which is formed in a cylinder housing 3 such that the gate 2 communicates with an injection cylinder (not shown). The pouring gate 2 also communicates with a manifold 4, and guides molten plastic material from the injection cylinder into the cavity of the mold through the manifold 4. This manifold 4 is formed in the manifold housing 5 provided at a position under the cylinder housing 3.

A plurality of injection nozzles 8 are formed in the top mold at positions under the manifold 4. The injection nozzles 8 are held in their places by a nozzle housing 7. A heating wire guide hole 6 is formed along the junction of the cylinder housing 3 and the manifold housing 5, with a heating wire 9 extending from an external power source (not shown) to the injection nozzles 8 through the guide hole 6 while passing around the manifold 4. The heating wire 9 is wound around the injection nozzles 8, and electrically heats the injection nozzles 8, in addition to heating the manifold 4.

When the heating wire 9 is electrically activated, it heats both the manifold 4 and the injection nozzles 8. Therefore, the molten plastic material flowing from the pouring gate 2 to the cavity of a bottom mold through both the manifold 4 and the injection nozzles 8 retains its molten phase by the heating wire 9, which passes around the manifold 4 and is wound around the injection nozzles 8.

However, the top mold 1 having such a conventional heating wire arrangement is problematic in that it is very difficult to repair or replace the heating wire 9. That is, when the heating wire 9 is undesirably cut, it is necessary to repair the wire 9 or replace the wire 9 with a new one. In such a case, the entire structure of the conventional top mold 1 must be disassembled since the heating wire 9 is led into the mold 1 through the heating wire guide hole 8 formed along the junction of the cylinder housing 3 and the manifold housing 5.

Therefore, the top mold 1 having such a heating wire arrangement is inconvenient to users and excessively consumes time while repairing the heating wire 9 or replacing the wire 9 with a new one. The top mold 1 also increases its maintenance cost. Since the injection molding process must be stopped for an undesired lengthy period of time during the process of repairing or replacing the heating wire, the productivity of the molded products is reduced.

SUMMARY OF THE INVENTION

Accordingly, the present invention has been made keeping in mind the above problems occurring in the prior art, and an object of the present invention is to provide a top mold of an injection molding machine, which is designed to allow easy and simple repair or replacement of a heating wire within a short period of time without entirely disassembling the top mold, and which is thus reduced in its maintenance cost and reduces the time the injection molding process is stopped while repairing or replacing the heating wire.

In order to accomplish the above object, the present invention provides a top mold of an injection molding machine, comprising a cylinder housing having a pouring gate, a manifold housing having a manifold and mounted on the lower surface of the cylinder housing, a nozzle housing having an injection nozzle and mounted on the lower surface of the manifold housing, and a heating wire wound around the injection nozzle, further comprising: a power supply wire guide hole formed on the lower surface of the nozzle housing; a power supply wire extending from an external power source to the heating wire through the power supply wire guide hole; a clip holding slit formed on the sidewall of the power supply wire guide hole; and a clip held in the clip holding slit and supporting the power supply wire at a desired place within the power supply wire guide hole; a connector connecting the power supply wire to the heating wire.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a sectional view of the conventional top mold of an injection molding machine; and FIG. 2 is a sectional view of a top mold of an injection molding machine in accordance with the preferred embodiment of the present invention.

DETAILED DESCRIPTION OF THE INVENTION

Reference now should be made to the drawings, in which the same reference numerals are used throughout the different drawings to designate the same or similar components.

FIG. 2 is a sectional view of a top mold of an injection molding machine in accordance with the preferred embodiment of the present invention.

As shown in the drawing, the top, mold 10 of an injection molding machine according to this invention includes a pouring gate 11, which is formed in a cylinder housing 12 such that the gate 11 communicates with an injection cylinder. The pouring gate 11 also communicates with a manifold 13, and guides molten plastic material from the injection cylinder into the cavity of the mold through the manifold 13. This manifold 13 is formed in a manifold housing 14 provided at a position under the cylinder housing 12.

A plurality of injection nozzles 15 are formed in the top mold at positions under the manifold 13. The injection nozzles 15 are held in their places by a nozzle housing 16, and commonly communicate with the manifold 13. The nozzle housing 16 supports the upper peripheral surface of the injection nozzles 15 so as for the molten plastic material to be smoothly flowed into the cavity of the bottom mold through the injection nozzles 15. A heating wire 22 is wound around the injection nozzles 15 to generate heat. A power supply wire guide hole 18 is formed on the lower surface of the nozzle housing 16, with a power supply wire 17 extending from an external power source to the heating wire 22 through the guide hole 18. A plurality of clip holding slits 20 are formed on opposite sidewall of the power supply wire guide hole 18, and hold a clip 19 used for supporting the power supply wire 17 at a desired place within the guide hole 18. A connector 21 is provided beside the nozzle housings 15 and connects the power supply wire 17 to the heating wire 22.

The operational effect of the top mold 10 will be described herein below.

During an injection molding process, a molten plastic material under pressure primarily flows from the injection cylinder into the manifold 13 through the pouring gate 11, and secondarily flows from the manifold 13 into the injection nozzles 15. The molten plastic material is, thereafter, injected from the injection nozzles 15 into the cavity of the mold.

When the plastic material within the cavity is hardened, the top mold is separated from the bottom mold so as to remove the plastic product from the cavity.

In such a case, the power supply wire 17 extends from an external power source to the heating wires 22 through the power supply wire guide hole 18, and the heating wire 22 is wound around the nozzles 15 starting from the connector 21. The heating wire 22 is primarily connected to the connector 21, provided at the outside of the top mold 10, and is secondarily connected to the power supply wire. Within the power supply wire guide hole 18, the power supply wire 17 is supported at a desired place by the clip 19 held in the clip holding slits 20.

When the power supply wire 17 is electrically activated, the heating wires 22 wound around the injection nozzles 15 generate heat and provide the injection nozzles 15 with heat. Therefore, the molten plastic material retains its molten phase by the power supply wire 17 when the plastic material flows in the injection nozzles 15.

When the heating wire 17 is undesirably cut, it is necessary to repair the wire 9 or replace the wire 9 with a new one. In such a case, the heating wire 17 of this invention can be effectively repaired or replaced without forcing the entire structure of the top mold 10 to be disassembled. That is, it is possible to repair or replace the heating wire 17 of this invention after the top mold 10 is only partially disassembled, different from the conventional top mold 1. Therefore, the top mold 10 of this invention allows a user to easily and simply repair or replace the heating wire 17 within a short period of time, and so the maintenance cost of the top mold 10 is reduced.

In a detailed description, the clip 19 is primarily removed from the clip holding slits 20 of the heating wire guide hole 18 when it is desired to repair or replace the heating wire 17. After the clip 19 is removed from the slits 20, the nozzle housing 16 is removed from the manifold housing 14 prior to removing the injection nozzles 15 from the manifold 13.

When the injection nozzles 15 are removed from the top mold 10 as described above, the heating wire 17 is completely removed from the top mold 10 since the wire 17 is set around the nozzles 15.

After both the injection nozzles 15 and the power supply wire 17 are removed from the top mold 10 as described above, the power supply wire 17 may be repaired or replaced with a new one after disassembling the injection nozzles 15. Alternatively, the injection nozzles 15 may be replaced with new ones wound around with new heating wire 22 connected to new power supply wire 17. Thereafter, the parts of the top mold 10 are assembled into a single structure.

In order to assemble the parts of the top mold 10 into a single structure, the injection nozzles 15 having new heating wires 22 are assembled with the manifold 13 prior to assembling the nozzle housing 16 with the manifold housing 14. After the nozzle housing 16 is assembled with the manifold housing 14, the power supply wire 17 is set within the power supply wire guide hole 18 prior to seating the clip 19 in the clip holding slits 20 of the guide hole 18 such that the clip 19 stably holds the power supply wire 17 within the guide hole 18. The assembling of the top mold 10 is thus finished. As described above, the present invention provides a top mold of an injection molding machine. The top mold of this invention is designed to allow a user to easily and simply repair or replace a power supply wire within a short period of time without entirely disassembling the top mold. It is thus possible to reduce the maintenance cost of the top mold and reduce the time the injection molding process is stopped while repairing or replacing the power supply wire.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A top mold of an injection molding machine, comprising a cylinder housing having a pouring gate, a manifold housing having a manifold and mounted on a lower surface of said cylinder housing, and a nozzle housing having an injection nozzle, and mounted on a lower surface of said manifold housing, the improvement comprising:

a power supply wire extending from an external power source to a connector positioned beside the injection nozzle;

a power supply wire guide hole formed on a lower surface of said nozzle housing;

a heating wire extending from said power supply wire to said injection nozzle through the connector and wound around the injection nozzle;

a clip holding slit formed on a sidewall of said power supply wire guide hole; and a clip held in the clip holding slit and supporting the power supply wire at a desired place within said power supply wire guide hole; the heating wire being wound around the injection nozzle to heat the injection nozzle and to maintain plastic in the injection nozzle in molten form.

* * * * *